Nov. 28, 1967  R. J. ROSA  3,355,607
MEANS FOR AND METHOD OF PREVENTING FLOW OF HALL
CURRENTS IN ELECTRICAL EQUIPMENT
Filed Aug. 27, 1964  4 Sheets-Sheet 1

RICHARD J. ROSA
INVENTOR.

BY Alden D. Redfield
Melvin E. Frederick
ATTORNEYS

RICHARD J. ROSA
*INVENTOR.*

BY Alden D. Redfield
Melvin E. Frederick
ATTORNEYS

Nov. 28, 1967   R. J. ROSA   3,355,607
MEANS FOR AND METHOD OF PREVENTING FLOW OF HALL
CURRENTS IN ELECTRICAL EQUIPMENT
Filed Aug. 27, 1964   4 Sheets-Sheet 4

RICHARD J. ROSA
*INVENTOR.*

BY Alden D. Redfield
Melvin E. Frederick
ATTORNEYS

United States Patent Office 3,355,607
Patented Nov. 28, 1967

3,355,607
MEANS FOR AND METHOD OF PREVENTING FLOW OF HALL CURRENTS IN ELECTRICAL EQUIPMENT
Richard J. Rosa, Reading, Mass., assignor to Avco Corporation, Cincinnati, Ohio, a corporation of Delaware
Filed Aug. 27, 1964, Ser. No. 392,497
19 Claims. (Cl. 310—11)

The present invention relates to an improved means for and method of preventing the flow of Hall currents in electrical equipment and more particularly in magnetohydrodynamic (hereinafter abbreviated "MHD") generators and accelerators. For convenience, the invention is described with particular reference to MHD generators which generate power by movement of electrically-conductive fluid relative to a magnetic field, but is not limited to such applications.

Although the possibility of generating power by the interaction of electrically-conductive fluid and a magnetic field has long been known, it has not been until recent years that such MHD devices have been investigated seriously for use in industry. This is illustrated by the Karlovitz et al. German Patent No. 725,433 which issued Sept. 22, 1942, showing that the basic principles are well known. While the Karlovitz et al. patent is directed to a Hall current-type generator, practical problems, however, such as the flow of Hall current at undesired points in Hall current generators, and the flow of Hall current per se within so-called Faraday-type MHD generators (as disclosed, for example, in the Rudenberg U.S. Patent No. 1,717,413), have limited advances in the field.

MHD generators usually employ an electrically-conductive working fluid from a high-temperature, high-pressure source. From the source, the fluid flows through the generator with which is associated a magnetic field and electrodes between which a flow of current is induced by movement of the fluid relative to the magnetic field. The fluid exhausts to a sink, which may simply be the atmosphere, and in more sophisticated systems may comprise a recovery system including pumping means for returning the fluid to the source. The working fluid may comprise a high-temperature, high-pressure gas, such as helium or argon, to which is added about 1% potassium or cesium to promote ionization and, hence, electrical conductivity. The gas is composed of electrons, positive ions, neutral atoms, and neutral molecules and may, for convenience, be termed "plasma."

As the plasma flows through the generator in the presence of an electric field and a magnetic field oriented at right angles to the electrical field, curved movements of charged particles occur under the influence of both fields. By virtue of such movements, separation of negative and positive charges occur in the plasma resulting in a substantial potential gradient along the length of flow of the plasma. Under the influence of the potential gradient, known as the "Hall potential," current will circulate longitudinally through the plasma and electrodes of the generator. These currents, which are known as "Hall currents," oppose direct flow of current through the plasma between the electrodes and constitute a serious loss of operating efficiency in the Faraday-type MHD generator.

In patent application Ser. No. 860,973, filed Dec. 21, 1959, now Patent No. 3,324,318, and entitled, "Means for and Method of Preventing Hall Currents in Electrical Equipment," of which I am a co-inventor, there is disclosed a means for and method of establishing along the length of the plasma stream a potential gradient comparable to that which tends to be established within the plasma by the Hall effect. By matching the potential gradient, preferably along the electrodes, to the gradient established within the plasma by the Hall effect, potential differences between the plasma and the electrodes necessary to the flow of Hall current are eliminated, and the Hall current itself is prevented from circulating within the generator. As disclosed in the aforementioned application, the prevention of the flow of Hall current may involve the use of segmented electrodes to interrupt the path of flow of Hall current. Further, by selectively interconnecting the segments of the electrodes, it is possible to establish the preferred gradient along the path of plasma flow whereby potential differentials that would otherwise encourage flow of Hall current are avoided.

From the preceding discussion, it will now be seen that it has generally been supposed that linear (Hall current and Faraday) MHD generators can be operated efficiently at large Hall parameters by the use of segmented electrodes, the walls of the duct containing the electrodes being composed alternately of conducting and insulating segments. In this way, it was believed possible to allow the load current to flow across the channel, while preventing unintended flow of current in the direction of the Hall field. In part, this optimism is based on the successful use of segmented electrodes in MHD generators.

However, prior art segmented electrodes are inherently subject to losses which are due to the nonuniformity of the transverse current, i.e., the current which flows across the duct and between opposed electrodes. These losses have been estimated in "Influence of Tensor Conductivity on Current Distribution in an MHD Generator," Journal of Applied Physics, volume 32, page 205, 1961, for the case of uniform gas properties and a current distribution which varies only in the plane normal to the magnetic field. The case of variations in the plane normal to the flow of direction, also for uniform gas properties, has also been considered. These prior art calculations correctly predict the existence of a region of very high ohmic losses near the electrodes. Accordingly, the properties of the plasma or gas will be strongly affected in this region of dissipation. In particular, if the generator is intended to operate with nonequilibrium ionization due to joule heating, the electron heating will be much greater in the region of high ohmic losses than in the bulk of the gas flow, and this will in turn result in a considerable variation of the conductivity.

The joule losses near the electrodes are increased by the concentration of the current there; for high magnetic fields this concentration is very great, and further, the current concentrates at the downstream end of one electrode (the cathodes) and the upstream end of the opposing electrode (the anodes).

It may appear that the very high ohmic losses near the electrodes should not be very important in nonequilibrium generators because in a nonequilibrium gas the conductivity increases with current density making the joule dissipation nearly proportional to the total current, but independent of current density.

However, the loss mechanism inherent to segmented electrodes is, in fact, aggrevated by the nonequilibrium effects, a fact on which the present invention is based. Stated differently, in any nonequilibrium generator using segmented electrodes, the rise in electron temperature will occur near the electrodes long before it appears in the free stream, the resultant rise in conductivity near the electrodes tends to short the Hall field in the free stream, resulting in a serious loss in overall performance.

The present invention is directed to an improved means for and method of establishing, along the length of the plasma stream in an MHD device having segmented electrodes, a potential gradient comparable to that which tends to be established within the plasma by the Hall effect.

The prevention or at least reduction of the flow of Hall currents in an MHD device having segmented electrodes may be accomplished in accordance with the present invention by varying the resistance of different portions of each electrode to produce at the exposed surface of each electrode a potential gradient that at least approximately matches the potential gradient adjacent the exposed surface established by the Hall effect within the plasma. Accordingly, these portions of each electrode, which may be either separate or integral, may be coupled to separate output leads, the resistance of the portions of each electrode preferably varying substantially progressively to provide a substantially uniform flow pattern between the oppositely disposed electrodes and the gas, i.e., provide at the exposed surface of each electrode in a direction parallel to the direction of gas flow a potential gradient that at least approximately matches the potential gradient adjacent the exposed surface of the electrode established by the Hall effect within the plasma. The present invention is particularly useful in high $\omega\tau$ generators (generators having a high ratio of magnetic field strength to gas pressure) under conditions where nonequilibrium ionization is sought or at any rate is apt to occur in the vicinity of the electrodes whether it is wanted or not.

From the foregoing, it will be understood that an object of the present invention is to provide an improved means for and method of preventing flow of Hall current within electrical equipment.

More specifically, it is an object of the present invention to provide an improved means for and method of preventing circulation of Hall current within MHD accelerators and generators.

It is another object of the present invention to provide a more uniform current flow pattern than heretofore possible from one side of the duct of an MHD device to the other side of the duct, wherein the tendency of currents to concentrate at the electrodes and the axial density along the insulating material between the electrodes is at least reduced.

It is another object of the present invention to make a generator, having a reasonable number of segmented electrodes, appear to the gas as having a high or essentially infinite number of electrodes.

Another object of the present invention is to provide at the exposed surface of segmented electrodes in an MHD device a potential gradient that at least approximately matches the potential gradient adjacent the exposed surfaces of the electrodes established by the Hall effect within the plasma.

The novel features that are considered characteristic of the present invention are set forth in the appended claims; the invention itself, however, both as to its organization and method of operation, together with additional objects and advantages thereof, will best be understood by the following description of specific embodiments when read in conjunction with the accompanying drawings in which:

Figure 1:
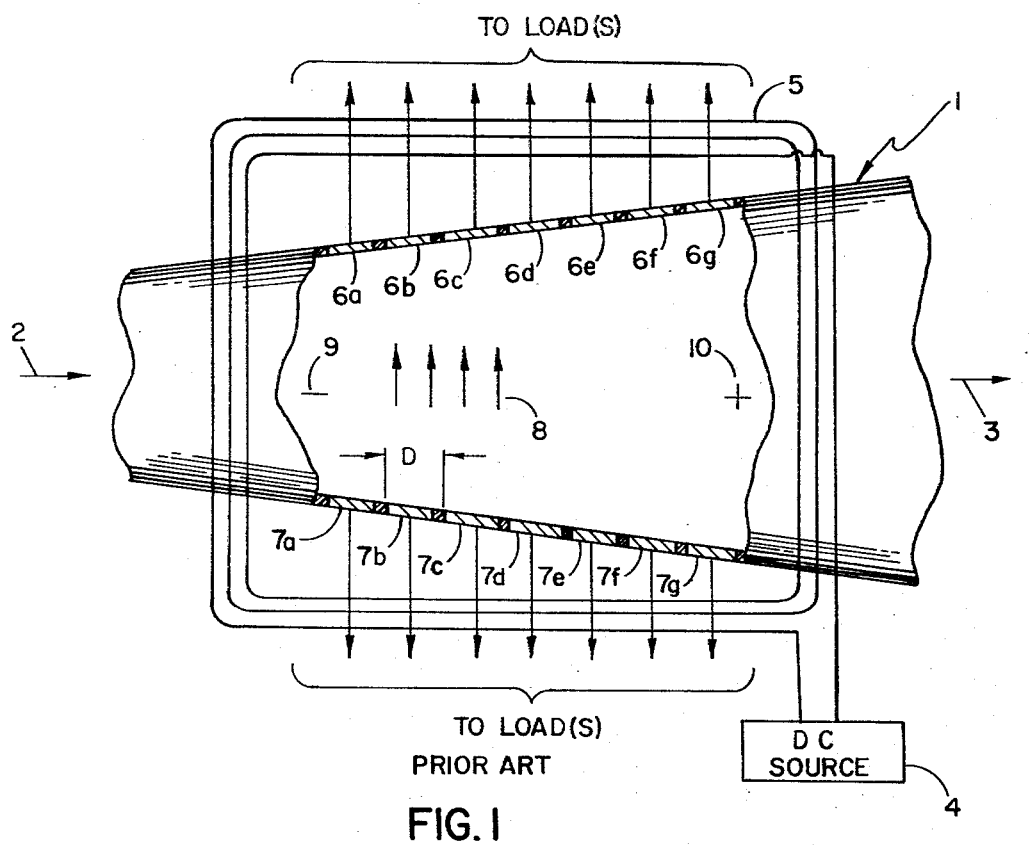
FIGURE 1 is a schematic illustration of what is now considered to be a conventional MHD generator.

Shown in FIGURE 1 is a simplified form of what is now considered to be a conventional MHD generator. It comprises a generally divergent duct 1 into which high temperature plasma under pressure is supplied at 2, the plasma leaving the generator at 3. The plasma may be at 3000° K. and under a pressure of 10 atmospheres. Because of its high temperature and composition, the plasma is electrically conductive and may have a conductivity in the order of 100 mhos/meter. A magnetic field coil 5, comprising a continuous electrical conductor that may be supplied with electricity from a DC source 4, or from the MHD generator itself, surrounds the exterior of duct 1 and provides a magnetic field transverse to the plasma stream and perpendicularly to the plane of the paper. Within the duct are provided separate electrically insulated electrodes designated 6a, 6b, 6c . . . 6g, and 7a, 7b, 7c . . . 7g. It will be noted that the electrodes of each group are positioned in side by side relationship, the groups of electrodes on opposite sides of the duct defining transverse patterns for current flow essentially normal to the direction of both the plasma stream and the magnetic lines of force. The groups of electrodes may be connected in series or opposed pairs connected to separate loads as disclosed in the aforementioned patent application Ser. No. 860,973. The movement of the plasma or gas stream relative to the magnetic field induces an E.M.F. 8 between the electrodes. In a linear Faraday-type generator of the type shown in FIGURE 1, the Hall potential will be present as previously explained. The Hall potential is designated by the minus sign 9 downstream and the plus sign 10 upstream. D designates the electrode spacing in a direction parallel to the direction of gas flow. It will be noted that the D dimension equals the length (dimension in a direction parallel to the direction of gas flow) of one electrode plus the length of the insulation between adjacent electrodes. This dimension also equals the center to center distance between adjacent electrodes. For purposes of comparison, the D dimension is the same in FIGURES 1–5.

It has previously been pointed out that ionization which tends strongly to occur first in a layer over the walls of an MHD generator duct containing the electrodes produces effectively a short circuit or at least a leakage circuit for the Hall potential which can drastically reduce the performance of linear MHD generators. In conventional MHD generators, as shown for example in FIGURE 1, as $\omega\tau$ increases, current flow between the opposed electrodes tends to concentrate at the downstream end of the cathodes and the upstream end of the opposing anodes. Further, there is also a tendency toward high axial current densities along the insulating material between the electrodes. Accordingly, it will be seen that a uniform current flow pattern does not exist under such circumstances. As disclosed in previously mentioned patent application Ser. No. 860,973, segmentation of the electrodes may be used to prevent virtual collapse of performance due to the flow of Hall currents. Extremely fine segmentation is desirable, especially when nonequilibrium effects occur. However, for very practical reasons, extremely fine electrode segmentation is not practically possible. Accordingly, prior art segmentation is effective to only prevent the flow of gross Hall currents.

Figure 2:
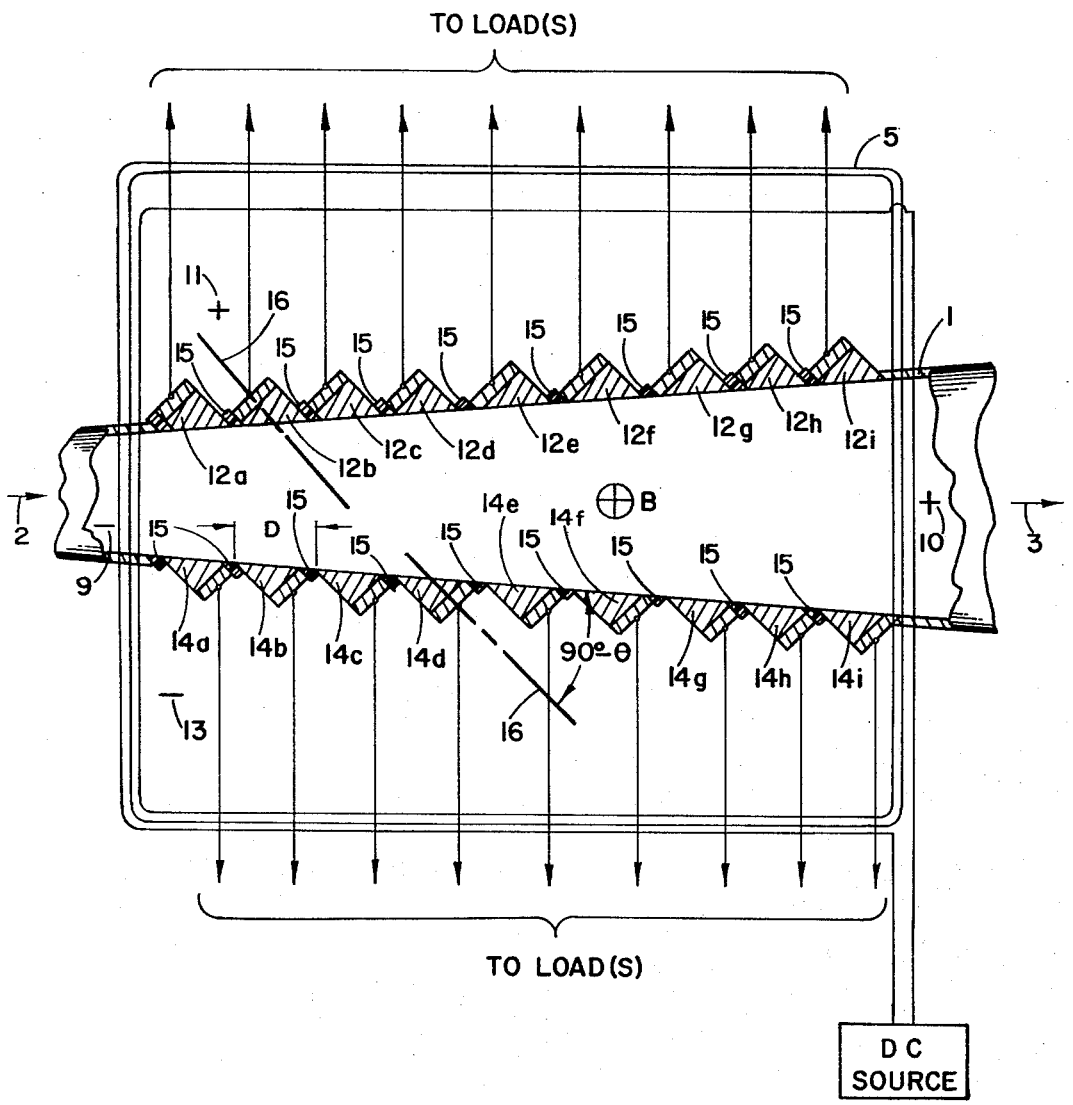
FIGURE 2 is a schematic illustration of an MHD generator having segmented electrodes arranged and disposed in accordance with the teaching of the present invention.

The embodiment in accordance with the present invention, as shown in FIGURE 2, overcomes the previously noted disadvantages of the prior art constructions and makes a generator having reasonably segmented electrodes appear, so far as the gas is concerned, to have substantially infinitely segmented electrodes by, inter alia, providing a uniform current flow pattern across the MHD duct between opposed electrodes, preventing high axial current densities along the insulating material between the electrodes particularly for a high $\omega\tau$, and establishing a uniform voltage gradient along the electrode walls which at least approximately matches the Hall potential gradient that appears in the gas under ideal conditions.

With the exception of the electrodes, the generator shown in FIGURE 2 is identical to that shown in FIGURE 1. The positive sign 11 between the first two upper output leads indicates that electrodes 12a–12i are cathodes and the negative sign 13 preceding the first lower output lead indicates that the electrodes 14a–14i are anodes. The cross in a circle designates that the magnetic flux or magnetic lines of force are going into the paper. Attention is particularly directed to the fact that while the surfaces or faces of electrodes 12a–12i exposed to the gas are respectively directly opposite the exposed surfaces or faces of electrodes 14a–14i, the longitudinal axes of the electrodes lie at an angle to the longitudinal axis of the duct. Thus, the exposed face of electrode 12a is opposite the exposed face of electrode 14a, but the longitudinal axis of electrode 12a, for example, is either parallel with or approximately parallel with the longitudinal axis of electrode 14c, depending on conditions in the gas. Two such axes, designated by the segmented lines 16, are shown disposed at an angle to the longitudinal axis of the duct. Similarly, the exposed face of electrode 12b is opposite the exposed face of the electrode 14b, but the longitudinal axis 16 of electrode 12b is generally parallel with the longitudinal axis 16 of electrode 14d, etc. It is to be understood, however, that as more fully discussed hereinafter, the aforementioned angle generally will not remain constant as one progresses from the furtherest upstream point of the electrodes to the furthest downstream point of the electrodes. The manner of connection of the electrodes to a load or loads is not essential to the invention. However, for purposes of discussion, it may be assumed that opposite pairs of electrodes (12a–14a, 12b–14b, etc.) are connected to separate loads. Insulating material 15 electrically insulates the electrodes from each other and the duct 1.

Figure 3:
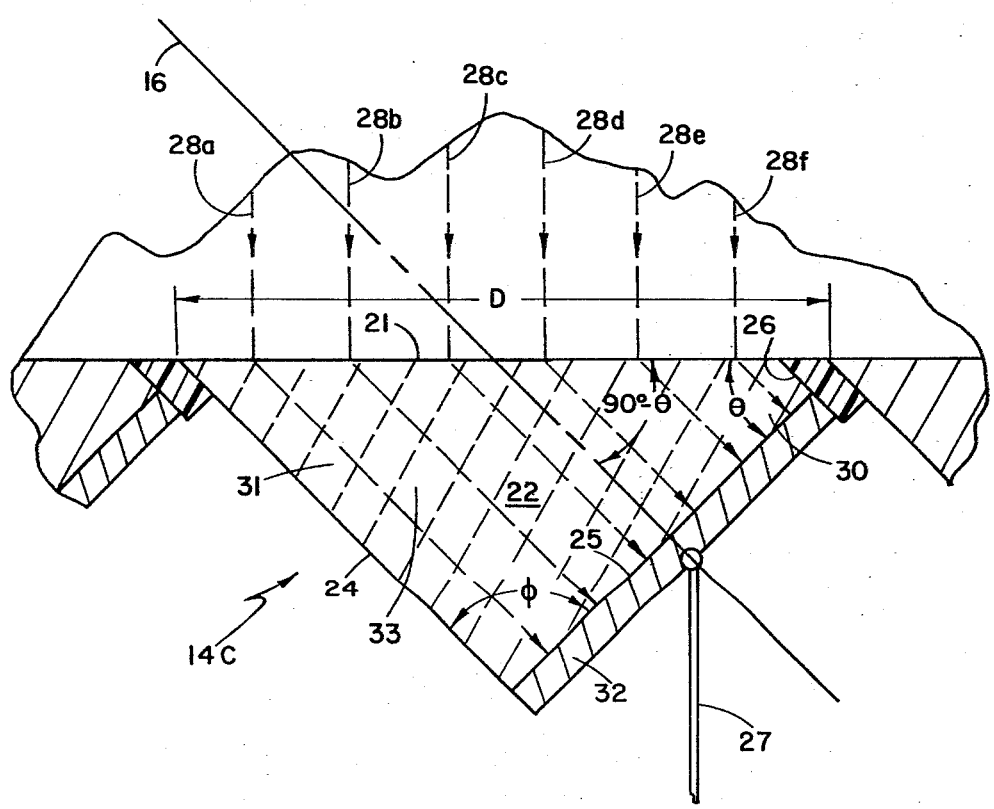
FIGURE 3 is a schematic illustration on an enlarged scale illustrating current flow through an electrode in accordance with the teaching of the present invention.
Figure 4:
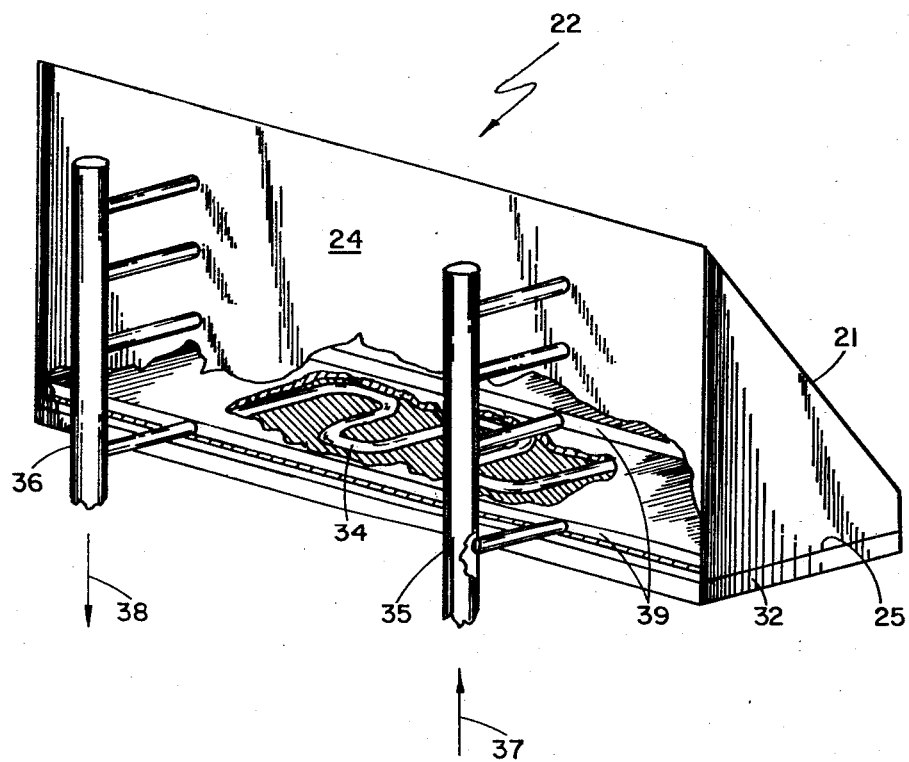
FIGURE 4 is a schematic illustration of an arrangement for controlling the temperature and/or varying the resistivity of an electrode of the type shown in FIGURE 3.

Attention is now directed to FIGURES 3 and 4 which show on an enlarged scale an integral electrode in accordance with the present invention. The exposed surface 21 of electrode block 22 is preferably flush and coplanar with the electrode wall of the duct, as shown in FIGURE 2, and extends substantially thereacross in a direction parallel to the direction of the magnetic lines of force.

The lonigtudinal axis (that axis passing through the exposed end surface and the surface connected to the output lead) of prior art electrodes are essentially normal to the inner surface of the electrode wall of the duct. However, inspection of FIGURES 2 and 3 shows that in accordance with the present invention, the longitudinal aixs of each electrode (taking anode 14c as a reference and viewing it from the lower downstream end of the duct) is disposed at an angle of less than 90° to the inner surface of the electrode wall, which is to say the exposed surface 21 of the electrode. Thus, broadly speaking, an electrode in accordance with the present invention may be visualized as more or less wedge-shaped in side view or as a rectangular block in end view wherein the exposed surface of the electrode is not at right angles to two of the side faces of the electrode. Accordingly, as best shown in FIGURE 3, the longitudinal axis 16 of electrode 14c is disposed at an angle of about 90°−θ to the exposed surface 21 and the end face 25 from which current is taken is disposed at generally right angles to side face 24 and side face 26 and at about an angle θ to the exposed surface 21. It will now readily be seen that the distance (taken normal to end face 25) between the exposed surface 21 and end face 25 increases substantially linearly, that the anodes are inclined at an angle of about 90°−θ in the upstream direction, and that the cathodes are also inclined at an angle of about 90°−θ, but in the downstream direction. Accordingly, the greatest dimension between exposed surface 21 and end wall 25 occurs at the point where the current tends to concentrate.

Directing attention now particularly to FIGURE 3, current flow through the electrode block 22 and between the gas and the output lead 27 is designated by the broken lines 28a–28f. Thus, the current 28a entering the furthest lefthand portion 31 of the electrode block 22 must flow a longer distance to an electrically conductive metal plate 32 than current 28b in the next adjacent portion 33 of the electrode block 22. As one moves to the right in FIGURE 3, the distance that currents 28c–28f must flow through the various portions of the electrode block 22 progressively descreases to a small or negligible distance. Because of the resistivity of the material comprising electrode block 22, which preferably is in the same range as that of the gas, the potential at the lefthand side of the exposed surface 21 will be higher than at the righthand side of surface 21. Thus, if the resistance of the electrode varies substantially progressively from right to left, then it follows that a potential gradient will be provided at the exposed surface 21 that vary substantially progressively from right to left. Assuming that the electrode itself does not exhibit a Hall effect, the plate 32 of copper, steel or the like, depending on the temperatures involved, bonded to and in electrical contact with the rear or current-collecting face 25 of the electrode will function as an equipotential surface and current flow to it in the electrode will be at essentially right angles to the plate.

If the electrode does exhibit a Hall effect, which isn't likely, the angles θ and φ may be changed in conventional manner to compensate for this. In general then, the angle φ will be a right angle and the optimum angle θ is determined by the ratio between the conductivity of the gas and the electrode and the value of ωτ. The angle θ is given by the equation:

$$\tan \theta = \sigma_c \omega \tau / \sigma_g$$

where $\sigma_c$ is the conductivity of the electrode; $\sigma_g$ is the conductivity of the gas; $\omega$ is the electron cyclotron frequency and $\tau$ is the electron mean free time between collisions with gas particles. In order to provide a convenient angle θ, such as for example 45°, the electrode should in general have a lower conductivity than that of the gas by a factor of about 1 to 10. In general, materials which satisfy this condition will be semi-conductors and preferably refractory semiconductors, such as for example zirconia. Further, as more fully discussed in connection with FIGURE 4, the conductivity $\sigma_c$ of the electrode can be varied to match changes in the conductivity $\sigma_g$ of the gas by regulating the temperature of the electrode. It is to be understood that ωτ and the conductivity of the gas will inherently vary at different locations in the duct. Accordingly, the resistance or the angle θ must also vary as one progresses from the upstream electrodes to the downstream electrodes. Thus, in a practical construction a first upstream group of electrodes may be made out of the same material and have a given angle θ; and the succeeding group or groups may be made out of a different material and/or have a different angle θ because of the conditions in the duct at this group or groups of succeeding electrodes. On the other hand, a given material, such as for example zirconia, may be used for all of the electrodes, all of the electrodes having the same or substantially the same angle θ, if desired. In this case, the conductivity of different electrodes may be varied in the equation by varying the operating temperature of the proper electrodes to permit the use of the same angle θ or at least an angle θ that is convenient.

It should be further understood that the distance between the exposed surface of the electrodes and the current-collecting rear face increases linearly only if the Hall potential gradient in the duct varies uniformly. If this is not the case, then, of course, the rate that the distance varies between the exposed surface and the current-collecting surface preferably at least substantially matches the rate at which the Hall potential gradient varies in the region adjacent each electrode. Further, if the resistance of the electrodes is not uniform due, for example, to non-uniformity in heating of the electrodes, then the spacing of the aforementioned surfaces should be varied to compensate for this nonuniformity.

In view of the preceding discussion, it will readily be seen that dissipation in the electrodes is inevitable. This dissipation is given by the formula:

$$W_d = E_H D I$$

where $W_d$ is the total dissipation, half of which occurs in the anodes and half of which occurs in the cathodes; $E_H$ is the Hall potential gradient; D is the center to center distance between adjacent electrodes; and I is the total output current. Although one would perfer that the dissipation $W_d$ did not exist, it unfortunately is unavoidable, and the present invention causes it to occur in the electrodes rather than in the gas, whereas in prior art devices it produces nonuniformity and subsequent performance collapse. The total dissipation $W_d$ is reduced as the center to center distance D between adjacent electrodes is reduced. Accordingly, the total dissipation $W_d$ may be reduced to its smallest practical value by increasing the segmentation of the electrodes to the highest practical value.

Directing attention now to FIGURE 4, there is shown an arrangement for varying the resistivity of an electrode, formed of zirconia for example, in accordance with the present invention. The electrode is shown in FIGURE 4 in a manner to best illustrate the provision of metal heat exchanger plates containing at least one coolant passage for passing a coolant through given region of the electrode. As shown in FIGURE 4, the electrode block 22 may be provided with a plurality of heat exchanger plates 39 spaced one from another, embedded in the electrode block 22 and essentially parallel to the current-collecting plate 32. Each heat exchanger plate 39 contains a coolant passage 34 one end of which is coupled to an electrically nonconductive inlet header 35 and the other end of which is coupled to an electrically nonconductive outlet header 36. The flow of coolant is arbitrarily designated by the arrows 37 and 38. The coolant used must, of course, be a poor conductor of electricity, such as, for example, water. As previously noted, to prevent short circuiting, the headers 35 and 36 must be formed of a suitable electrically nonconductive material. The resistivity of the electrodes when formed of zirconia, for example, may be controlled or maintained at a predetermined value by controlling the volume or temperature of the coolant supplied to one or more of the heat exchanger plates as by valves, variable pumps or the like (not shown).

Figure 5:
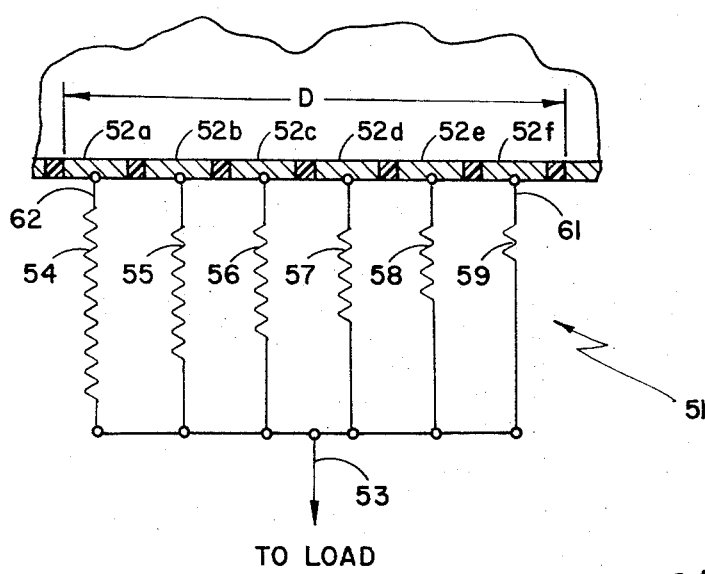
FIGURE 5 is a schematic illustration of a modified form of electrode in accordance with the present invention.

An alternate form of electrode construction is shown in FIGURE 5. In this figure, the single electrode of FIGURE 3 is replaced by an electrode 51 comprising a plurality of (in this case 6) discrete segments 52a–52f formed of a suitable electrode material and having a conventional configuration, i.e., formed of tungsten and having the conventional rectangular prismatic configuration. However, it should be noted that the discrete segments 52a–52f forming part of the single electrode 51 are coupled to a single output lead 53 through a series of resistive elements such as resistors 54–59. The function of the segments and the resistors, consonant with the function of the electrode block 22 of FIGURE 3, is to provide a plurality of resistive portions the resistance of which increases from right to left or left to right, depending on whether the electrode is an anode or a cathode. Thus, while portion 61 of FIGURE 5 is a discrete portion comprised of segment 52f and resistor 59, it is comparable to the integral extreme right-hand portion 30 of the electrode block 22 shown in FIGURE 3; portion 62 comprised of segment 52a and resistor 54 of FIGURE 5 is comparable to the extreme left-hand portion 31 of the electrode block 22 shown in FIGURE 3; and the remaining portions comprised of respectively segments 52b–52e and resistors 55–58 are comparable to the portions of the electrode block 22 shown in FIGURE 3 intermediate the extreme right and left-hand portions 30 and 31. It should be noted that the dimension D of FIGURE 5 is the same as the dimension D of FIGURE 1, as is also true of FIGURE 3.

It will be readily apparent that the resistors 54–59 can be either separate from or integral with their respective segments 52a–52f and that the principle of operation of the arrangement shown in FIGURE 5 is substantially the same as that of the electrode block 22 shown in FIGURE 3, except that a stepwise instead of a uniform voltage gradient results. However, the steps are smaller than they would be if one conventional electrode were connected to each output lead. Accordingly, the resistors 54–59 may be graded whereby the resistance of the various portions (the resistance between the segments of each electrode and its respective output lead) varies substantially progressively, for example, from a first value to a second higher value to provide a potential at the surface of the electrode (comprised of the surfaces of the various segments) that at least approximately matches the potential gradient adjacent the electrode established by the Hall effect within the gas.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In an MHD device having a duct for conveying an electrically-conductive gas through a magnetic field, the combination comprising:
    (a) a plurality of oppositely disposed electrode means exposed to said gas, electrically insulated from and carried by said duct, said electrode means being substantially aligned substantially perpendicularly to the magnetic flux of said magnetic field and the direction of flow of said gas; and
    (b) an output lead electrically coupled respectively to each said electrode means, each said electrode means comprising a plurality of resistive portions electrically coupled to a single one of said output leads and having different values of resistance, the resistance of said portions varying substantially progressively to provide at each said electrode means a substantially uniform current flow pattern between said oppositely disposed electrodes and said gas.

2. In an MHD device having a duct for conveying an electrically-conductive gas through a magnetic field, the combination comprising:
    (a) a plurality of oppositely disposed electrode means exposed to said gas, electrically insulated from and carried by said duct, said electrode means being substantially aligned substantially perpendicularly to the magnetic flux of said magnetic field and the direction of flow of said gas; and
    (b) an output lead electrically coupled respectively to each said electrode means, each said electrode means comprising a plurality of resistive portions electrically coupled to a single one of said output leads and having different values of resistance, the resistance of said portions varying substantially progressively to provide at the exposed surface of said electrodes a substantially progressively varying electric potential at each said electrode when current is flowing between said gas and said output leads.

3. In an MHD device having a duct for conveying an electrically-conductive gas through a magnetic field, the combination comprising:
    (a) a plurality of oppositely disposed electrode means exposed to said gas, electrically insulated from and carried by said duct, said electrode means being substantially aligned substantially perpendicularly to the magnetic flux of said magnetic field and the direction of flow of said gas; and
    (b) an output lead electrically coupled respectively to each said electrode means, each said electrode means comprising a plurality of resistive portions electrically coupled to a single one of said output leads and having different values of resistance, the resistance of said portions varying substantially progressively to provide at the exposed surface of each of said electrodes a substantially progressively varying electric potential when current is flowing between said gas and said output leads, whereby the tendency of current flowing through said electrodes to concentrate in predetermined regions is at least reduced.

4. In an MHD device having a duct for conveying an electrically-conductive gas through a magnetic field, the combination comprising:
(a) a plurality of oppositely disposed electrode means exposed to said gas, electrically insulated from and carried by said duct, said electrode means being substantially aligned substantially perpendicularly to the magnetic flux of said magnetic field and the direction of flow of said gas; and
(b) an output lead electrically coupled respectively to each said electrode means, each said electrode means comprising a plurality of resistive portions electrically coupled to a single one of said output leads, the resistance of said portions substantially progressively varying from a first value to a second higher value.

5. In an MHD device having a duct for conveying a hot electrically-conductive gas through a magnetic field, the combination comprising:
(a) a plurality of oppositely disposed electrode means exposed to said gas, electrically insulated from and carried by said duct, said electrode means being substantially aligned substantially perpendicularly to the magnetic flux of said magnetic field and the direction of flow of said gas; and
(b) an output lead electrically coupled respectively to each said electrode means, each said electrode means having a plurality of resistive portions one end of which is exposed to said hot gas and the opposite end of which is electrically coupled to a single one of said output leads, the resistance between the said ends of said portions of each said electrode means substantially progressively varying from a first value to a second higher value.

6. In an MHD device having a duct for conveying a hot electrically-conductive gas through a magnetic field, the combination comprising:
(a) a plurality of oppositely disposed electrode means exposed to said gas, electrically insulated from and carried by said duct, said electrode means being substantially aligned substantially perpendicularly to the magnetic flux of said magnetic field and the direction of flow of said gas; and
(b) an output lead electrically coupled respectively to each said electrode means, each said electrode means having a plurality of portions one end of which is substantially flat and exposed to said hot gas and the opposite end of which is substantially flat and electrically coupled to a single one of said output leads, the resistance between the said ends of said portions substantially progressively varying from a first value to a second higher value, said opposite end comprising a surface at about an angle $\theta$ to said one end where $$\tan \theta = \sigma_c \omega \tau / \sigma_g$$

and $\sigma_g$ is the conductivity of said gas, $\sigma_c$ is the conductivity of each said electrode, $\omega$ is the electron cyclotron frequency and $\tau$ is the electron mean free time between collisions with gas particles.

7. In an MHD device having a duct for conveying an electrically-conductive gas through a magnetic field, the combination comprising:
(a) a plurality of oppositely disposed electrodes electrically insulated from and carried by respectively the portions of said duct substantially parallel to the magnetic lines of flux of said magnetic field, said electrodes being comprised of a material having a resistance in about the same range of the resistance of said gas and having a first surface and a second surface disposed between two side surfaces, said first surface being exposed to said gas and the distance between said first and second surfaces increasing substantially linearly; and
(b) a plurality of electrically-conductive means having an electrical conductivity greater than that of said material respectively in electrical contact with substantially all of each of said second surfaces.

8. In an MHD device having a duct for conveying an electrically-conductive gas through a magnetic field, the combination comprising:
(a) a plurality of oppositely disposed generally prismatic electrodes electrically insulated from and carried by respectively the portion of said duct substantially parallel to the magnetic lines of flux of said magnetic field, said electrodes being comprised of a material having a resistance in about the same range of the resistance of said gas and having at least three faces comprising a first end face exposed to said gas, a side face disposed at an angle of less than 90° to said first end face, and a second end face disposed at about 90° to said side face, the distance between said first and second faces increasing substantially linearly; and
(b) a plurality of electrically-conductive means having an electrical conductivity greater than that of said material respectively in electrical contact with substantially all of each said second end faces.

9. In an MHD device having a duct for conveying an electrically-conductive gas through a magnetic field, the combination comprising:
(a) a plurality of oppositely disposed generally prismatic electrodes electrically insulated from and carried by respectively the portion of said duct substantially parallel to the magnetic lines of flux of said magnetic field, said electrodes being comprised of a material having a resistance in about the same range of the resistance of said gas and having at least three faces comprising a first end face exposed to said gas, a side face disposed at an angle of less than 90° to said first face, and a second end face disposed at about 90° to said side face, the distance between said first and second faces increasing at a substantially linear rate determined by the equation $$\tan \theta = \sigma_c \omega \tau / \sigma_g$$

where $\theta$ is the angle between said first and second end faces, $\sigma_c$ is the conductivity of each said electrode, $\omega$ is the electron cyclotron frequency, $\tau$ is the electron mean free time between collisions with gas particles, and $\sigma_g$ is the conductivity of the gas; and
(b) a plurality of electrically-conductive means having an electrical conductivity greater than that of said material respectively in electrical contact with substantially all of each said second faces.

10. In an MHD device having a duct for conveying an electrically-conductive gas through a magnetic field, the combination comprising:
(a) a plurality of oppositely disposed generally prismatic electrodes electrically insulated from and carried by respectively the portion of said duct substantially parallel to the magnetic lines of flux of said magnetic field, said electrodes being comprised of a material having a resistance in about the same range of the resistance of said gas and having at least three faces comprising a first end face exposed to said gas, a side face disposed at an angle of less than 90° to said first face, and a second end face disposed at about 90° to said side face, said second face being disposed at about an angle $\theta$ to said first face where $$\tan \theta = \sigma_c \omega \tau / \sigma_g$$

where $\theta$ is the angle between said first and second faces, $\sigma_c$ is the conductivity of each said electrode, $\omega$ is the electron cyclotron frequency, $\tau$ is the electron mean free time between collisions with gas particles, and $\sigma_g$ is the conductivity of the gas; and
(b) a plurality of electrically-conductive means having an electrical conductivity greater than that of said material respectively in electrical contact with substantially all of each said second faces.

11. In an MHD device having a duct for conveying an electrically-conductive gas through a magnetic field and a first potential gradient established by the Hall effect within the gas extending along the interior of said duct in a direction parallel to the direction of movement of said gas, the combination comprising:

(a) a plurality of oppositely disposed generally prismatic electrodes electrically insulated from and carried by respectively the portion of said duct substantially parallel to the magnetic lines of flux of said magnetic field, said electrodes being comprised of a material having a resistance in about the same range of the resistance of said gas and having at least three faces comprising a first end face exposed to said gas, a side face disposed at an angle of less than 90° to said first end face, and a second end face disposed at about 90° to said side face, the distance between said first and second end faces increasing substantially linearly; and (b) a plurality of electrically-conductive means having an electrical conductivity greater than that of said material respectively in electrical contact with substantially all of each said second end faces whereby the flow of current between said first and second end faces of each electrode establishes at each said first face a second potential gradient that at least approximately matches the said first potential gradient adjacent each said first face.

12. In an MHD device having a duct for conveying a stream of electrically-conductive gas and means for establishing magnetic flux through said duct normal to the direction of flow of the gas, the combination comprising:

(a) opposed electrodes within said duct, electrically insulated therefrom and carried by respectively the portions of said duct substantially parallel to said magnetic flux, each of said electrodes comprising a plurality of discrete segments;

(b) a plurality of output leads; and (c) a plurality of resistive means respectively connected between said segments of each electrode and an output lead, the resistance between the segments of each electrode and its respective output lead substantially progressively varying in the direction of gas flow from a first value to a second higher value.

13. In an MHD device having a duct for conveying a stream of electrically-conductive gas and means for establishing magnetic flux through said duct normal to the direction of flow of the gas, the combination comprising:

(a) opposed electrodes within said duct, electrically insulated therefrom and carried by respectively the portions of said duct substantially parallel to said magnetic flux, each of said electrodes comprising a plurality of discrete segments;

(b) a plurality of output leads; and (c) a plurality of resistive means respectively connected in series between the segments of each electrode and an output lead whereby the segments of each said electrode are separately coupled to a single output lead, the resistance between the segments of each electrode and its respective output lead substantially progressively varying in the direction of gas flow from a first value to a second higher value to provide a second potential gradient within said duct that at least approximately matches a first potential gradient adjacent said electrodes established by the Hall effect within said gas and extending in a direction parallel to the direction of movement of said gas.

14. In an MHD device having a duct for conveying an electrically-conductive gas through a magnetic field and a first potential gradient established by the Hall effect within the gas extending along the interior of said duct in a direction parallel to the direction of movement of said gas and a second potential gradient normal to said first potential gradient and said magnetic field, the combination comprising:

(a) opposed electrodes within said duct, electrically insulated therefrom and carried by respectively the portions of said duct substantially parallel to said magnetic flux, each of said electrodes comprising a plurality of closely spaced discrete segments, the dimension of each said segment in the direction of movement of said gas being such that the said first potential gradient across each said segment is small compared to said second potential gradient;

(b) a plurality of output leads; and (c) a plurality of resistive means respectively connected in series between the segments of each electrode and an output lead whereby the segments of each said electrode are separately coupled to a single output lead, the resistance between the segments of each electrode and its respective output lead substantially progressively varying in the direction of gas flow from a first value to a second higher value to provide a second potential gradient within said duct that at least approximately matches said first potential gradient adjacent said electrodes.

15. The method of preventing circulation of Hall current within an MHD device having a duct through which flows a stream of electrically-conductive gas, means for establishing magnetic flux through the gas perpendicular to its direction of flow and opposed segmented electrodes within the duct and exposed to said gas between which an electrical field exists mutually perpendicular to the direction of gas flow and the magnetic flux comprising:

(a) varying the resistance of each said electrode to cause current flowing through different portions of each said electrode to produce at the exposed surface of each said electrode a potential gradient that at least aprpoximately matches the potential gradient adjacent said exposed surface established by the Hall effect within the plasma, whereby potential differentials between the gas and said electrode are eliminated and flow of local Hall current is prevented.

16. The method of preventing circulation of Hall current within an MHD device having a duct through which flows a stream of electrically-conductive gas, means for establishing magnetic flux through the gas perpendicular to its direction of flow and opposed segmented electrodes within the duct and exposed to said gas between which an electrical field exists mutually perpendicular to the direction of gas flow and the magnetic flux comprising:

(a) in different portions of said electrodes in a direction parallel to the direction of flow of said gas, varying the resistance of said portions to cause current flowing therethrough to provide along the length of the exposed surface of each said electrode in said direction parallel to the direction of flow of said gas a potential gradient that at least approximately matches the potential gradient adjacent said electrode length established by the Hall effect within the plasma, whereby potential differentials between the gas and said electrode are eliminated and flow of Hall current is prevented.

17. The method of preventing circulation of Hall current within an MHD device having a duct through which flows a stream of electrically-conductive gas, means for establishing magnetic flux through the gas perpendicular to its direction of flow and opposed segmented electrodes within the duct and exposed to said gas between which an electrical field exists mutually perpendicular to the direction of gas flow and the magnetic flux comprising:

(a) forming each said electrode of a plurality of portions;

(b) coupling all of the portions of each said electrode to a different output lead; and (c) substantially progressively varying the resistance of said portions of each electrode to provide at the exposed surface of each said electrode a potential gradient that at least approximately matches the potential gradient adjacent said exposed surface and established by the Hall effect within the plasma, whereby potential differentials between the gas and said electrode segments are eliminated and flow of Hall current is prevented.

18. The method of preventing circulation of Hall current within an MHD device having a duct through which flows a stream of electrically-conductive gas, means for establishing magnetic flux through the gas perpendicular to its direction of flow and opposed segmented electrodes within the duct and exposed to said gas between which an electrical field exists mutually perpendicular to the direction of gas flow and the magnetic flux comprising:

(a) forming each said electrode of a plurality of integral portions;

(b) coupling all of the portions of each said electrode to a different output lead; and (c) substantially progressively varying the resistance of said portions of each electrode to provide at the exposed surface of each said electrode a potential gradient that at least approximately matches the potential gradient adjacent said exposed surface and established by the Hall effect within the plasma, whereby potential differentials between the gas and said electrode segments are eliminated and flow of Hall current is prevented.

19. The method of preventing circulation of Hall current within an MHD device having a duct through which flows a stream of electrically-conductive gas, means for establishing magnetic flux through the gas perpendicular to its direction of flow and opposed segmented electrodes within the duct and exposed to said gas between which an electrical field exists mutually perpendicular to the direction of gas flow and the magnetic flux comprising:

(a) forming each said electrode of a plurality of discrete portions;

(b) coupling all of the portions of each said electrode to a different output lead; and (c) substantially progressively varying the resistance of said portions of each electrode to provide at the exposed surface of each said electrode a potential gradient that at least approximately matches the potential gradient adjacent said exposed surface and established by the Hall effect within the plasma, whereby potential differentials between the gas and said electrode segments are eliminated and flow of Hall current is prevented.

References Cited
UNITED STATES PATENTS 3,149,247    9/1964    Cobine et. al. _____ 310—11

FOREIGN PATENTS 692,706    6/1940    Germany.

DAVID X. SLINEY, *Primary Examiner.*